US012177637B2

(12) United States Patent
Hwang

(10) Patent No.: US 12,177,637 B2
(45) Date of Patent: Dec. 24, 2024

(54) SPEAKER, SPEAKER SYSTEM AND SIGNAL COMPENSATION METHOD USING THE SAME

(71) Applicants: HYUNDAI MOTOR COMPANY, Seoul (KR); KIA CORPORATION, Seoul (KR)

(72) Inventor: Yonghwan Hwang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 139 days.

(21) Appl. No.: 17/889,506

(22) Filed: Aug. 17, 2022

(65) Prior Publication Data

US 2023/0125786 A1 Apr. 27, 2023

(30) Foreign Application Priority Data

Oct. 25, 2021 (KR) ........................ 10-2021-0143017

(51) Int. Cl.

*H04R 3/00* (2006.01)
*H04R 1/02* (2006.01)
*H04R 9/02* (2006.01)
*H04R 29/00* (2006.01)

(52) U.S. Cl.

CPC ............... *H04R 3/00* (2013.01); *H04R 1/023* (2013.01); *H04R 9/025* (2013.01); *H04R 29/003* (2013.01)

(58) Field of Classification Search

CPC .......... H04R 3/00; H04R 1/023; H04R 9/025; H04R 29/003; H04R 3/007; H04R 2/04; H04R 3/08; H04R 29/00; H04R 29/001
USPC ........................................ 381/58-59, 55, 77
See application file for complete search history.

(56) References Cited

U.S. PATENT DOCUMENTS

| | | | | |
|---|---|---|---|---|
| 10,327,061 B2 * | 6/2019 | Doy | ....................... | H04R 3/007 |
| 11,405,729 B1 * | 8/2022 | French | ................... | H04R 9/063 |
| 2011/0208163 A1 * | 8/2011 | Miesel | .............. | A61M 5/14276 604/523 |

* cited by examiner

*Primary Examiner* — Disler Paul
(74) *Attorney, Agent, or Firm* — Morgan, Lewis & Bockius LLP

(57) ABSTRACT

A speaker includes a housing including a front housing provided in a conductive material; a driver including a diaphragm; a magnetic circuit including a permanent magnet; and an electric circuit including a voice coil to which current is applied based on an input electrical signal, and a first electric circuit configured to vibrate the driver based on the voice coil and a magnetic field formed by the magnetic circuit; wherein the diaphragm include a coating that is surface-coated with a conductive material so as to have a capacitance with the front housing.

5 Claims, 11 Drawing Sheets

SPEAKER, SPEAKER SYSTEM AND SIGNAL COMPENSATION METHOD USING THE SAME

CROSS-REFERENCE TO RELATED APPLICATION(S)

This application claims the benefit of priority to Korean Patent Application No. 10-2021-0143017, filed on Oct. 25, 2021 in the Korean Intellectual Property Office, the disclosure of which is incorporated herein by reference.

TECHNICAL FIELD

The disclosure relates to a speaker, a speaker system, and a signal compensation method using the same, more particularly, relates to a speaker capable of improving audibility by compensating an output signal of the speaker, and a speaker system and a signal compensation method using the same.

BACKGROUND

In general, a speaker is a device that converts electrical voice signal current (electrical energy) into vibration energy to generate human audible voice or sound.

In a conventional speaker, when a user operates an acoustic system, a voice signal current is input and the voice signal current is transmitted to a voice coil through a signal line. In this case, the voice coil has only up/down direction vibration force on the drawing due to influence of magnetic flux formed by a plate and a magnet, and the up/down direction vibration force is transmitted to a diaphragm, thereby vibrating the diaphragm. The vibration of the diaphragm is transmitted to the user through a medium (e.g., air), so that the user may hear sound.

On the other hand, in the conventional sound system, a capacity of enclosure varies depending on a mounting position of a speaker, and thus spring constant of air affects performance of the speaker, leading to the predicted performance is not achieved and phenomenon in which nonlinearity is increased presents.

To solve such a problem, a conventional speaker performance compensation method measures amount of current consumption of a speaker or mounts additionally a sensor on a diaphragm of a speaker. However, measuring the amount of current consumption is inferior in quality to measuring movement of the diaphragm because the current consumed varies according to characteristics of the change in impedance as the speaker operates based on an alternating current (AC) signal. Furthermore, additionally mounting of the sensor increase the cost burden.

SUMMARY

An aspect of the disclosure is to provide a speaker capable of identifying capacitance with a diaphragm using a conductive grill of a conventional speaker, and a speaker system and a signal compensation method using the same.

Another aspect of the disclosure is to provide a speaker capable of compensating for an audio signal by identifying an error between an output signal and a measurement signal based on the identified capacitance, and speaker system and a signal compensation method using the same.

Additional aspects of the disclosure will be set forth in part in the description which follows and, in part, will be obvious from the description, or may be learned by practice of the disclosure.

In accordance with an aspect of the disclosure, a speaker includes a housing including a front housing including a conductive material; a driver including a diaphragm; a magnetic circuit including a permanent magnet; and an electric circuit including a voice coil to which current is applied based on an input electrical signal, and a first electric circuit configured to vibrate the driver based on the voice coil and a magnetic field formed by the magnetic circuit; wherein a surface of the diaphragm is coated with the conductive material so as to have a capacitance with the front housing.

The electric circuit may further include a second electric circuit including a first channel and a second channel connected to the front housing and the surface of the diaphragm, respectively, and capable of being connected to an external device.

The driver may further include a dust cap to prevent dust from entering the voice coil, and a surface of the dust cap may be coated with the conductive material so as to have a capacitance with the front housing.

The front housing may be partitioned into at least two areas that are insulated from each other, and the surface of the diaphragm is partitioned into at least two areas that are insulated from each other, so as to have a capacitance with each of the partitioned areas of the front housing.

The electric circuit may further include a plurality of second electric circuits that are respectively connected to the partitioned areas of the front housing and the partitioned areas of the surface of the diaphragm and are connectable to an external device.

The conductive material may include at least one of gold, silver, copper, zinc, aluminum and an aluminum alloy.

In accordance with another aspect of the disclosure, a speaker system includes a speaker including a diaphragm, a surface of the diaphragm being coated with a conductive material so as to have a capacitance with a front housing; and an amplifier; wherein the amplifier comprises a measuring unit configured to measure a capacitance of the speaker, a preprocessor configured to identify a measurement signal based on the capacitance, a converter configured to convert an input digital signal into an analog signal to generate an output signal, a processor configured to process the output signal and the measurement signal, and an outputter configured to amplify a signal output from the processor and output the amplified signal to the speaker, wherein the processor is configured to identify a first error between the output signal and the measurement signal based on processing of the output signal and the measurement signal, and output a compensated output signal based on the identified first error.

The surface of the diaphragm may be partitioned into at least two areas that are insulated from each other so as to have at least two capacitances with the front housing, the preprocessor identifies a plurality of measurement signals based on each of the at least two capacitances, and the processor is further configured to, based on processing of the identified plurality of measurement signals, identify a second error between the identified plurality of measurement signals, and in response to the identified second error being greater than a predetermined value, control differently the signal output to the outputter.

The processor may be further configured to limit a frequency of the signal output in response to the identified second error between the identified measurement signals being greater than the predetermined value.

In accordance with another aspect of the disclosure, a signal compensation method, the method includes generating, by an amplifier, an output signal and outputting the output signal to a speaker based on an input digital signal; measuring, by a measuring unit, a capacitance of the speaker; identifying, by a preprocessor, a measurement signal based on the capacitance; identifying, by a processor, a first error between the output signal and the measurement signal based on processing the output signal and the measurement signal; and outputting, by the processor, a compensated output signal based on the identified first error; wherein the speaker include a diaphragm, a surface of the diaphragm is coated with a conductive material so as to have a capacitance with the front housing.

The surface of the diaphragm may be partitioned into at least two areas that are insulated from each other so as to have at least two capacitances with the front housing, the identifying of the measurement signal further comprises identifying, by the preprocessor, a plurality of measurement signals based on each of the at least two capacitances; and the method further comprises identifying, by the processor, a second error between the identified plurality of measurement signals based on processing the identified plurality of measurement signals; outputting, by the processor, after compensation, at least one different signal in response to the identified second error being greater than a predetermined value.

The outputting after compensation may be configured to limit a frequency of the at least one different signal.

In accordance with another aspect of the disclosure, a computer-readable recording medium storing a program that causes a computer to: generate an output signal and outputting the output signal to a speaker based on an input digital signal; measure a capacitance of the speaker; identify a measurement signal based on the capacitance; identify a first error between the output signal and the measurement signal based on processing the output signal and the measurement signal; and output a compensated output signal based on the identified first error, wherein the speaker include a diaphragm, a surface of the diaphragm is coated with a conductive material so as to have a capacitance with a front housing.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
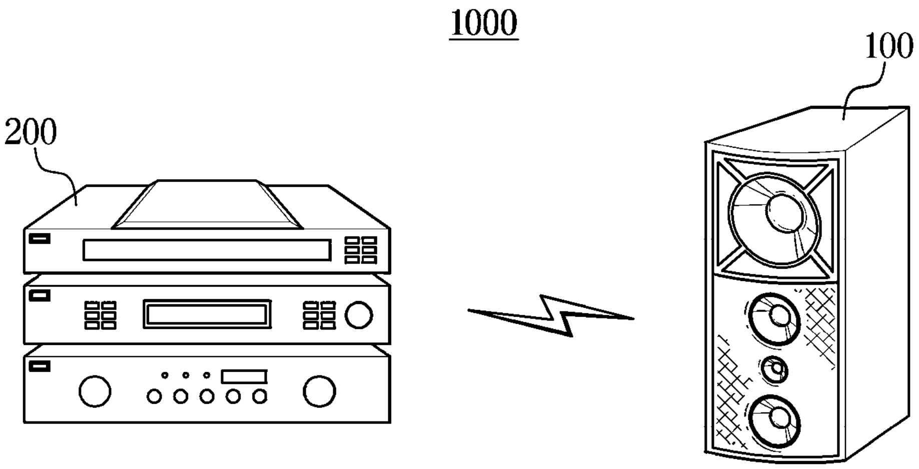
FIG. 1 is a schematic view illustrating a speaker system according to an embodiment of the disclosure.

Reference will now be made in detail to the embodiments of the disclosure, examples of which are illustrated in the accompanying drawings, wherein like reference numerals refer to like elements throughout. This specification does not describe all elements of the disclosed embodiments and detailed descriptions of what is well known in the art or redundant descriptions on substantially the same configurations have been omitted. The terms 'unit', 'processor', 'preprocessor', 'converter', 'inputter', 'outputter', 'controller', 'part', 'module', 'member', 'block' and the like as used in the specification may be implemented in software or hardware. Further, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the disclosure will be described in detail with reference to the accompanying drawings.

FIG. 1 is a schematic view illustrating a speaker system according to an embodiment of the disclosure. Hereinafter, a speaker system 1000 will be briefly described.

The speaker system 1000 according to an embodiment of the disclosure relates to an audio system used in a vehicle. In particular, by forming an acoustic signal output from a speaker installed in the vehicle to compensate for a distortion of a sound during an output process, even when the vehicle is driving at high speed or driving in a section with severe irregularities, the disadvantage of deterioration in sound quality due to speaker distortion is improved and the original reproduced sound generated from the speaker allows a driver to comfortably listen to the sound. In general, an audio system or the like is installed in a vehicle so that various sounds suitable for a drivers taste may be heard while driving or parked or stopped. By mounting a speaker on an interior side of a door trim of the vehicle, a desired sound may be heard through the speaker. However, the embodiment of the disclosure is not limited thereto. In another embodiment, the speaker system 1000 may be used in various places other than a vehicle.

On the other hand, depending on a mounting position of the speaker 100, a capacity (or size) of the enclosure changes, and thus causes spring constant of air to affect performance of a speaker, so that the predicted performance is not achieved and phenomenon in which nonlinearity is increased presents. The phenomenon of increasing nonlinearity causes problems in hearing and sound quality because it is difficult to predict performance in response to an input signal.

To solve such a problem, the conventional method for compensating speaker performance measures amount of current consumption of the speaker or additionally mounts a sensor on the speaker diaphragm.

However, impedance of the speaker 100 includes an impedance resulting from mechanical resistance and elasticity while a signal output through an amplifier 200 is transmitted to the voice coil, an impedance resulting from electrical inductance of the coil itself, and an impedance due to back electromotive force caused by the movement of the voice coil in a magnetic field, and the like. Therefore, the impedance of the speaker 100 may not be represented as a simple resistance component. Since the speaker 100 has a mechanically moving part, impedance components by a mechanical action also exists. The resistance of a speaker, such as 4Ω or 8Ω, is a simple direct current (DC) resistance component, and is very different from impedance for each frequency in the acoustic signal frequency band in which the speaker operates.

Accordingly, measuring the amount of current consumption is inferior in quality than measuring the movement of the diaphragm due to the presence of a change in current in response to the frequency, as described above. Furthermore, additionally mounting the sensor for measuring the movement of the diaphragm is a problem in that the cost burden increases.

To compensate for the nonlinearity of the output sound, the speaker system 1000 according to the embodiment of the disclosure uses a grill (front housing) made of a conductive material included in a conventional speaker. Furthermore, by coating the conductive material on a surface of the diaphragm of the speaker 100, the speaker system 1000 derives capacitance between the grill (front housing) and the diaphragm of the speaker 100 and compensates for the sound based on the movement of the diaphragm, thereby reducing the cost burden compared to adding the sensor and providing effect of significantly improving the audibility and sound quality.

Referring to FIG. 1, the speaker system 1000 may include the speaker 100 and the amplifier 200.

The speaker 100 and the amplifier 200 may be connected in a wireless and/or wired manner. In another embodiment, the amplifier 200 may be embedded in the speaker 100 and configured in the wired manner. Accordingly, contents of the amplifier 200 described below may be applied to the speaker 100.

An owner, a manager, and/or a user (hereinafter referred to as a 'user') may input a sound source constituted of a digital signal and/or an analog signal to the speaker system 1000. The sound source may include, for example, a direct audio input means such as a microphone, an optical digital data reading means such as a compact disk (CD) player, a magnetic reading means such as a cassette tape deck, a digital information output means such as a smartphone or computer, a radio signal, etc. Accordingly, the amplifier 200 may convert a digital signal input into an analog signal and amplify the converted analog signal to apply (transmit) to the speaker 100, or amplify an analog signal to apply (transmit) to the speaker 100.

In other words, the amplifier 200 may convert an analog/digital sound signal provided from at least one of these various means into an analog voltage or current waveform and output the converted signal to the speaker 100 as its own sound signal.

In response to reception of an analog sound signal, the speaker 100 is arranged to audibly output a specific location or an entire range in space. The speaker 100 has a unique impedance. In general, the speaker may be impedance-matched to the outputter of the amplifier 200.

The speaker 100 is constituted of a diaphragm, a stationary permanent magnet, a voice coil, a pole piece, a damper, etc., and is a device that converts an electrical signal into sound by vibrating the diaphragm according to a current flowing in a voice coil.

The speaker 100 reproduces sound as a pressure change in air generated by the movement of the voice coil. The voice coil is moved by electromagnetic force, and the electromagnetic force F is as shown in Equation 1 below.

$$F=BIL \qquad \text{[Equation 1]}$$

In Equation 1 above, B is a magnetic flux density by a permanent magnet, L is a length of a current path placed in a magnetic field, and I is a current. As can be seen from Equation 1 above, the voice coil is moved by the current, not a voltage. Therefore, to drive the movement of the diaphragm of the speaker according to the waveform of the signal, the same current as the waveform of the signal must flow. Meanwhile, the signal described below may refer to, for example, an audio signal, and the audio signal corresponds to a signal including a waveform as described above.

The output of the speaker 100 is a sound signal, and the intensity thereof is represented by a sound pressure level, which is proportional to an acceleration of the voice coil, and the acceleration of the voice coil is proportional to the current flowing through the voice coil.

Figure 2:
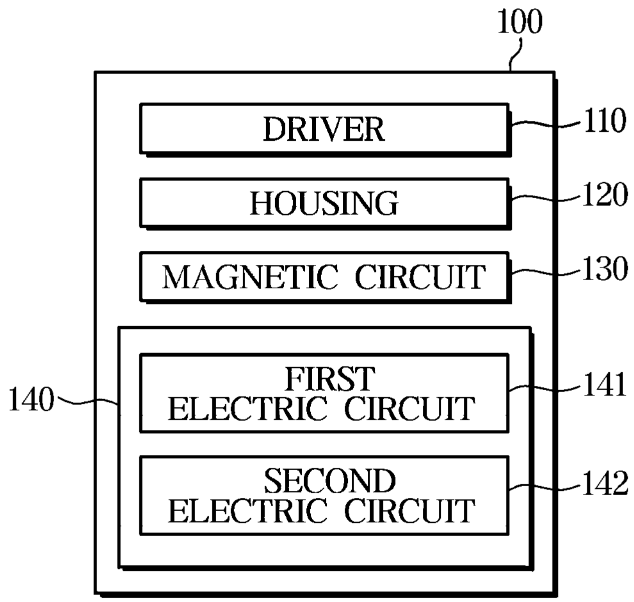
FIG. 2 is a block diagram illustrating a configuration of a speaker according to an embodiment of the disclosure.

FIG. 2 is a block diagram illustrating the configuration of the speaker 100 according to an embodiment of the disclosure.

Figure 3:
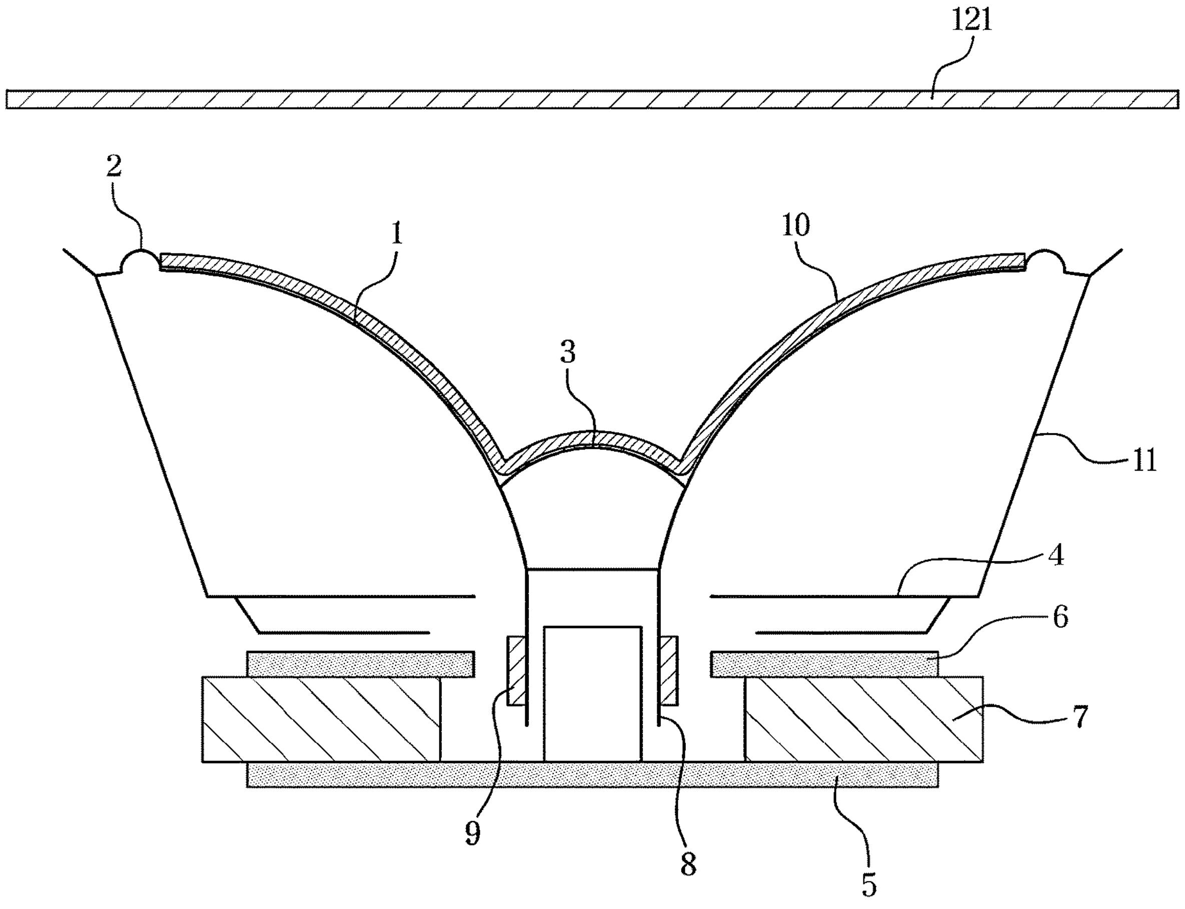
FIG. 3 is a schematic view for explaining a speaker according to an embodiment of the disclosure.

FIG. 3 is a schematic view illustrating the speaker 100 according to an embodiment of the disclosure.

Referring to FIGS. 2 and 3, the speaker 100 according to the embodiment of the disclosure may include a driver 110, a housing 120, a magnetic circuit 130, and an electric circuit 140 (including a first electric circuit 141 and a second electric circuit 142).

In the case of an electrical signal being applied by the electric circuit 140, in response to that vibration is generated by the magnetic circuit 130 that forms a magnetic field in accordance with the electrical signal, the driver 110 may convert such a physical movement into human audible sound.

The housing 120 may refer to an outer shape of the speaker 100 that includes the driver 110, the magnetic circuit 130, and the electric circuit 140 therein. The housing 120 includes at least one hole so that the sound converted by the driver 110 by vibration may be radiated to an outside of the speaker 100. In addition, the housing may include a front housing 121 disposed on a front side of the speaker 100 and a rear housing (not shown) that is coupled to the front housing 121 to form the outer shape of the speaker 100.

Furthermore, the housing 120 may include a frame 11 for fixing and supporting the driver 110, the magnetic circuit 130 and the electric circuit 140. The frame 11 may have a cone shape, but it is not limited thereto.

Herein, the front housing 121 may include a conductive material to conduct electricity. The conductive material may include, for example, gold, silver, copper, zinc, aluminum, an aluminum alloy, or the like, or may be a composite metal including at least one of the preceding materials. However, the embodiment of the disclosure is not limited thereto. In recent years, the front housing 121 made of conductive material (metallic material) is adopted widely in order to improve the quality of the speaker. Accordingly, the speaker 100 may realize the speaker system 1000 according to the embodiment of the disclosure without the addition of the front housing 121 including a separate metallic material.

The magnetic circuit 130 may include a bottom plate 5, a top plate 6 and a permanent magnet 7 between the bottom plate 5 and the top plate 6.

The electric circuit 140 includes the first electric circuit 141 and the second electric circuit 142. The first electric circuit 141 may include a bobbin 8 on an upper side of the bottom plate 5, a voice coil 9 attached to the bobbin 8. Furthermore, the voice coil 9 may be coupled (attached) along an outer circumferential surface of the bobbin 8.

In other words, in the speaker 100, as the sound signal output from the amplifier 200 flows through the voice coil 9 in the form of current, the bobbin 8 becomes an electromagnet. Accordingly, the bobbin 8 moves up and down by magnetic flux line of the permanent magnet 7 formed in the magnetic circuit 130. As a result, the diaphragm 1 extending from the bobbin 8 vibrate by up and down motion, and thus physical motion of the diaphragm 1 may be converted into sound.

In particular, referring to FIG. 3, the driver 110 included in the speaker 100 may include the diaphragm 1 that converts vibrations generated by an electrical signal into sound waves, an edge 2, as an outer part, that makes the vibration of the diaphragm 1 smoothly and made of an elastic material including rubber, etc., to always be restored to a center position thereof, a dust cap 3 for blocking an inflow of foreign substances such as dust into the inside of the speaker 100, and a damper 4 for suppressing excessive movement of the diaphragm 1 together with the edge 2, and the like.

Herein, the diaphragm 1 may be adopted a conventionally known material, such as a resin-based material including natural pulp, polypropylene (PP), reinforced polyvinyl chloride (PVC), etc., and a material including carbon fiber, and/or may be a material to be developed in the future.

As shown in FIG. 3, the driver 110 is provided on an upper side (with reference to the drawing) of the diaphragm 1 and/or the dust cap 3, and may be surface-coated with a conductive material in order to have a capacitance with the front housing 121 of the speaker 100 to form a surface coating 10 or coating. Herein, the surface coating 10 may include, for example, gold, silver, copper, zinc, aluminum and an aluminum alloy, or may a composite metal including at least one of the preceding materials.

The surface coating 10 may be formed in a variety of ways. However, since the material of the diaphragm 1 is not metal in most cases, it may be preferable to coat by a coating method such as a physical vapor deposition (PVD) and/or a chemical vapor deposition (CVD) and/or spray.

The frame 11 may be preferably molded of PP resin. It is because the PP resin is light in weight and has high tensile strength and good heat resistance, and particularly, may be fusible and fixed by ultrasonic waves with paper, fiber, rubber, and the like. Accordingly, the damper 4 may be fixed to the frame 11 by ultrasonic welding, and the edge 2 extending from the diaphragm 1 may be fixed to the frame 11 by ultrasonic welding. This may be available because the frame 11 is molded of the PP resin as described above. However, the embodiment of the disclosure is not limited thereto. In other words, the frame 11 may be applied a conventionally known frame and/or a frame to be developed in the future, and the edge 2 and the damper 4 that are extending to the diaphragm 1 may also be adhered (attached, extended, etc.) depending on conventionally known technologies and/or technologies to be developed in the future.

Figure 4A:
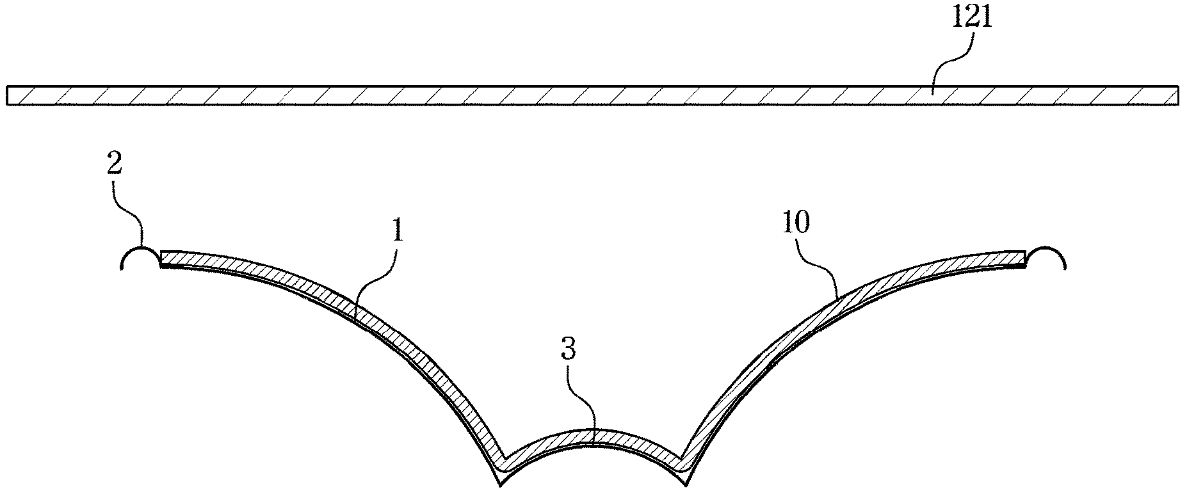
FIGS. 4A and 4B are a schematic view illustrating a capacitance measurement logic using a speaker according to an embodiment of the disclosure.
Figure 4B:
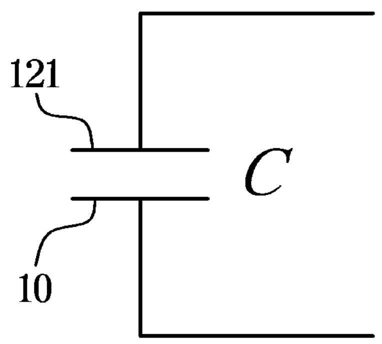

FIGS. 4A and 4B are a schematic view for explaining a capacitance measurement logic using the speaker 100 according to an embodiment of the disclosure.

A capacitor (or a condenser) is a device that stores electric capacity as electric potential energy in an electric circuit. The capacitor is a passive device with two terminals, and has a structure in which two conductive plates are separated thereinside. Charges are stored on a surface of each plate, and a magnitude of an amount of the charge collected on both surfaces is the same but opposite in sign.

An air capacitor is a capacitor that uses air itself as a dielectric. In the air capacitor, when two thin plates made of a conductive material vibrates with sound in the air, the distance between the two thin plates changes, thereby varying a capacitance value C.

Referring to FIGS. 4A and 4B, the surface-coating 10 in which a conductive material is coated on the upper surface of the diaphragm 1 of the speaker 100 may be one electrode plate of the capacitor C. Furthermore, because the front housing 121 of the speaker 100 includes a conductive material, this may also be the other electrode plate of the capacitor C. In other words, the speaker 100 may form a capacitor by using the front housing 121 and the surface coating 10 as electrode plates, respectively.

Meanwhile, referring to FIG. 4A, the surface coating 10 including the conductive material is illustrated to be coated on the upper surfaces of the dust cap 3 and the diaphragm 1, but it is not limited thereto. In another embodiment, the surface coating 10 may be coated on an inner circumferential surface of a frustum excluding the dust cap 3. Furthermore, the surface coating 10 will be described in detail below, but it may be partitioned into at least two areas. The partitioned areas may be those in which a conductive material is coated on the upper surface of the diaphragm 1 so as to be insulated from each other.

Figure 5:
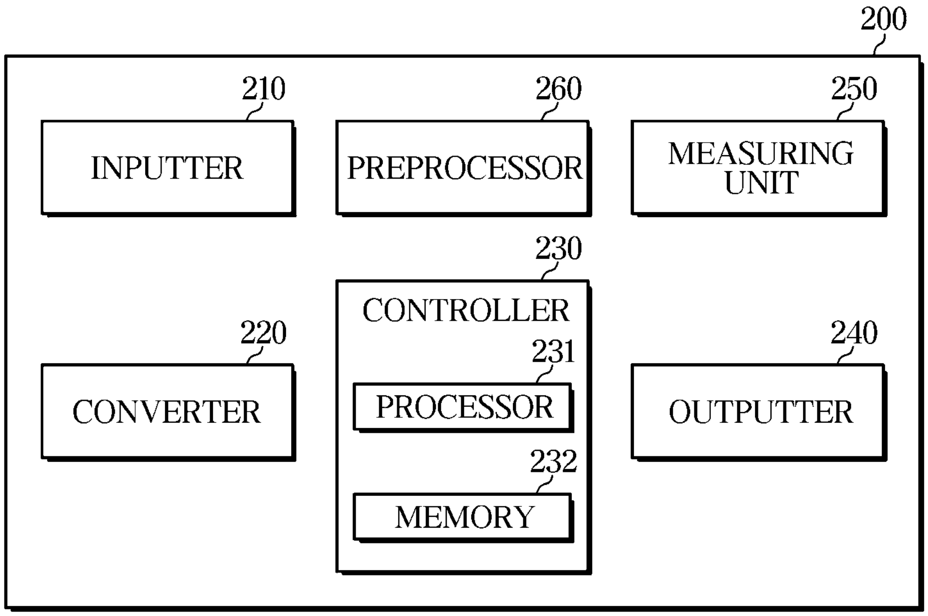
FIG. 5 is a block diagram illustrating a configuration of an amplifier according to an embodiment of the disclosure.

FIG. 5 is a block diagram illustrating the configuration of the amplifier 200 according to an embodiment of the disclosure.

Referring to FIG. 5, the amplifier 200 may include an inputter 210, a converter 220, a controller 230, an outputter 240, a measuring unit 250, and a preprocessor 260.

The inputter 210 receives a sound source composed of digital and/or analog signal through a plurality of input channels. Accordingly, a plurality of input channels may be provided to correspond to the number of channels of an external device and/or electronic device and/or external server capable of inputting the sound source. The inputter 210 receives the sound source including analog and/or digital signal through the input channels to output to the converter 220.

The converter 220 converts the analog and/or digital signal input through the inputter 210 into signal of a predetermined analog format. However, when the signal input to the inputter 210 is an analog signal, the converter 220 is not required essentially in the amplifier 200 of the disclosure. In other words, when the signal input to the inputter 210 is an analog signal, the inputter 210 may refer to outputting the signal to the controller 230 without going through the converter 220. Meanwhile, hereinafter, for convenience of description, the description is limited to a case in which digital signal is input to the inputter 210. However, in this case as well, when the analog signal is input to the inputter 210, as described above, the analog signal may be output to the controller 230 without going through the converter 220.

The controller 230 may be implemented by a memory 232 for storing data in algorithms for controlling the operation of components in the amplifier 200 or programs reproducing the algorithms, and a processor 231 for performing the above-described operation using the data stored in the memory 232. In this case, the memory 232 and the processor 231 may be implemented as separate chips. Alternatively, the memory 232 and the processor 231 may be implemented as a single chip.

The processor 231 may perform overall control regarding the operation of the amplifier 200.

The processor 231 processes each audio signal input through the above-described input channels according to a predefined internal processing procedure to output to the outputter 240. Meanwhile, the outputter 240 may include a plurality of amplifier elements. In this case, the processor 231 may selectively output a signal to each of the plurality of amplifier elements included in the outputter 240.

The processor 231 may perform one or more audio signal processing functions, such as a low-frequency filter, a high-frequency filter, a volume control, and mixing, and the like, due to the development of digital technology in general, and is mainly marketed in an integrated form as a single chip.

The processor 231 may process signal in which the digital signal input through the inputter 210 is converted into analog signal by the converter 220. Hereinafter, the signal converted into the analog signal by the converter 220 is referred to as an output signal, for convenience of description. In other words, the processor 231 receives an output signal from the converter 220, and processes the output signal to output to the outputter 240. Accordingly, the outputter 240 may be a component that converts the output signal into sound by transmitting the amplified output signal to the speaker 100.

Meanwhile, the processor 231 may further process a measurement signal. Herein, the measurement signal may refer to an audio sound signal in which the sound is generated in an analog form again by measuring the sound output from the speaker 100 and pre-processing.

Accordingly, the processor 231, based on processing the output signal and the measurement signal, may identify an error between the output signal and the measurement signal, compensate the output signal based on the identified error, and output the compensated output signal to the outputter 240, resulting in converting into the compensated acoustic sound.

The memory 232 may store various information on the amplifier 200. The memory 232 may store a program and/or data for the processor 231 to process the output signal and/or the measurement signal, and a program and/or data for the processor 231 to generate the compensated output signal.

To this end, the memory 232 may be implemented as at least one of a nonvolatile memory such as a cache, a read only memory (ROM), a programmable ROM (PROM), an erasable programmable ROM (EPROM), an electrically erasable programmable ROM (EEPROM), and/or a flash memory (Flash memory), a volatile memory such as a random access memory (RAM), and a storage medium such as a hard disk drive (HDD), or a compact disk (CD-ROM), but it is not limited thereto.

The outputter 240 amplifies the respective audio signal output by the above-described processor 231 and outputs the amplified audio signal to the speaker 100. The outputter 240 includes amplifier elements that amplify the audio signal input from the controller 230, a spare amplifier element that replaces and operates the error amplifier element when an error occurs in any one of the amplifier elements, and an error detection element that detects errors of each of the elements. Each of the amplifier elements performs a function of amplifying a plurality of audio signals input from the processor 231. In addition, when overcurrent, overvoltage, undervoltage, overtemperature, etc. are detected in each amplifier element, the error detection element outputs an error signal corresponding to the detected error signal to the processor 231. When an error occurs in one of the amplifier elements, the spare amplifier element amplifies the audio signal input under the control of the processor 231.

The outputter 240 includes a plurality of output channels. The output channels output each audio signal input from the processor 231 to the speaker 100.

The measuring unit 250 may include at least one sensor configured to measure a capacitance between the front housing 121 of the speaker 100 and the surface coating 10.

In particular, the electric circuit 140 of the speaker 100 may further include the second electric circuit 142 that is respectively connected to the front housing 121 and the surface coating 10 to be connected to an external device. In other words, to measure the capacitance between the front housing 121 and the surface coating 10, the second electric circuit 142 includes a first channel connecting the front housing 121 and the measuring unit 250 and a second channel connecting the surface coating 10 and the measuring unit 250, so that the front housing 121 and the surface coating 10 may be connected to the measuring unit 250, respectively. Therefore, the measuring unit 250 may measure the capacitance between the front housing 121 and the surface coating 10, but it is not limited thereto. In other words, it should be understood that the electric circuit 140 may omit the second electric circuit 142 depending on a capacitance measurement method.

On the other hand, the capacitance measurement method may be measured through a conventionally known capacitance measurement method and a capacitance measurement method to be developed in the future, and since a fact that is obvious to those skilled in the art, a description of the capacitance measurement method will be omitted.

Hereinafter, a method of measuring a mechanical distance between the diaphragm 1 and the front housing 121 based on the capacitance will be described.

The capacitance is proportional to a dielectric constant of air and an area of the electrode plates, and is inversely proportional to a distance between the electrode plates. Accordingly, it may be understood that the distance is proportional to the dielectric constant of air and the area of the electrode plates, but is inversely proportional to the capacitance.

Accordingly, the higher the capacitance measured by the measuring unit 250, the shorter the distance between the surface coating 10 and the front housing 121. The lower the capacitance, the longer the distance between the surface coating 10 and the front housing 121.

On the other hand, the preprocessor 260 may identify the measurement signal based on the capacitance measured by the measuring unit 250.

More specifically, the identification of the measurement signal based on processing the measured capacitance received from the measuring unit 250 may be, for example, identification based on a measurement signal calculation model learned through a supervised learning algorithm. In other words, the measurement signal calculation model may refer to a model that outputs a measurement signal with a learning data set as an input.

On the other hand, herein, the learning data set may be a data set including input terminal data and output terminal data. For example, the input terminal data may include various parameters of the speaker 100 (e.g., parameters of the speaker 100, such as an impedance of the speaker 100, a physical property value of the diaphragm, a permittivity of the air inside the speaker, the area of the diaphragm 1, the area of the front housing 121, etc.) and signal output by the outputter 240, at the input terminal for a machine learning of the supervised learning. The output terminal data may include a sound signal actually output by the speaker 100. The data sets described above may be generated, for example, experimentally or empirically, but are not limited thereto. In other words, the data sets may be applied a conventionally known machine learning algorithm including a unsupervised learning, a reinforcement learning and/or a supervised learning, or a machine learning algorithm developed in the future.

Accordingly, the preprocessor 260 inputs the parameters of the speaker 100 and the signal output by the outputter 240 to the measurement signal calculation model and outputs the measurement signal, thereby identifying the measurement signal.

Figure 6:
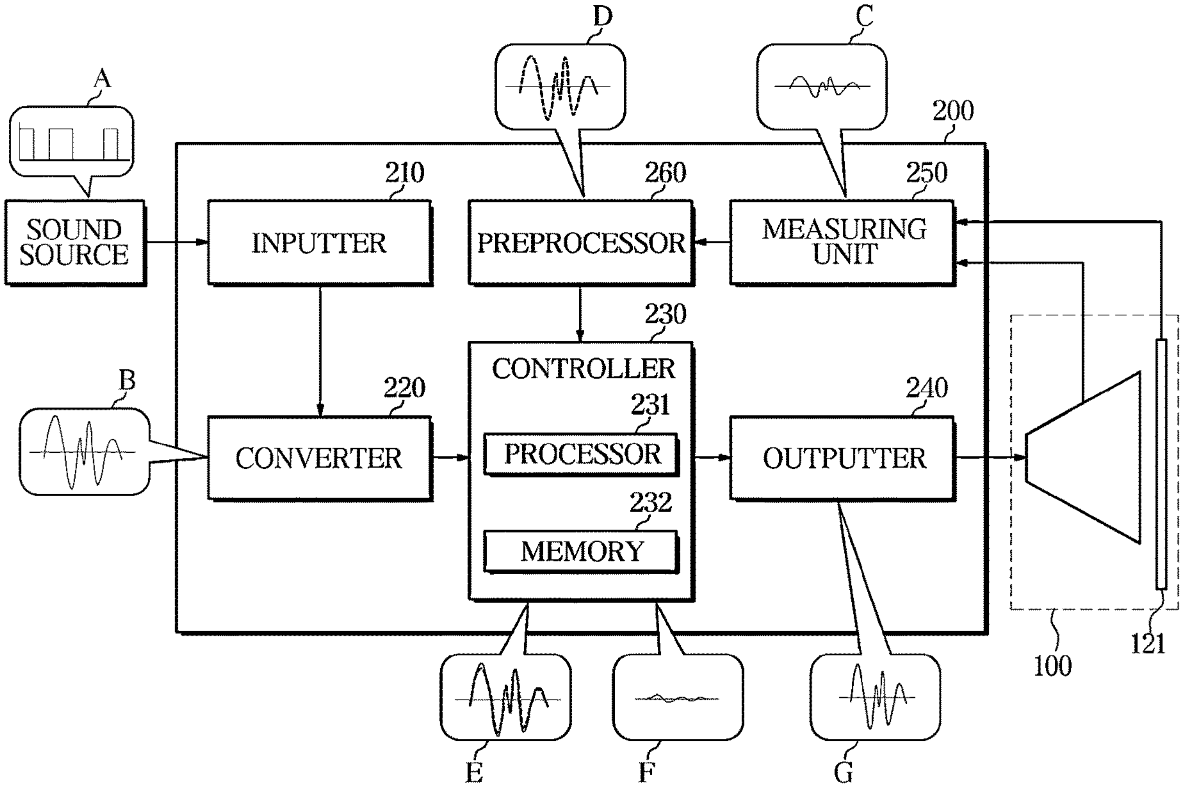
FIG. 6 is a schematic view illustrating a speaker system according to an embodiment of the disclosure.

FIG. 6 is a schematic view for explaining the speaker system 1000 according to an embodiment of the disclosure.

The speaker system 1000 may include the speaker 100 in which a conductive material is coated on the surface of diaphragm 1 to form the capacitance C with the front housing 121, and the amplifier 200.

Referring to FIG. 6, in the speaker system 1000, an audio signal A having a digital waveform may be input to the inputter 210 of the amplifier 200. In this case, the inputter 210 may output to the converter 220 in order to convert the digital waveform audio signal A into the analog waveform audio signal (output signal) B.

The converter 220 may convert the digital waveform audio signal A received from the inputter 210 into the analog waveform audio signal (output signal) (B), and output the output signal B to the controller 230. Accordingly, the controller 230 transmits the output signal B received from the converter 220 to the outputter 240, and the outputter 240 outputs the output signal B to the speaker 100, so that the speaker 100 may generate the sound based on the output signal B.

However, in this case, as described above, a problem in that the nonlinearity of the performance is included as it is occurs. To solve the problem, the speaker system 1000 includes the second electric circuit 142 including the first channel connecting the front housing 121 of the speaker 100 and the measuring unit 250 and the second channel connecting the surface coating 10 and the measuring unit 250, and thus the measuring unit 250 may measure the capacitance C between the front housing 121 of the speaker 100 and the surface coating 10.

The preprocessor 260 receives the capacitance C measured by the measuring unit 250 and inputs the capacitance C to the above-described measurement signal calculation model, thereby identifying the measurement signal D and outputting the identified measurement signal D to the controller 230.

Accordingly, the controller 230, based on the processing of the output signal B transmitted by the converter 220 and the measurement signal D identified by the preprocessor 260, may make a comparison E of the output signal B and the measurement signal D, and identify an error F between the output signal B and the measurement signal D.

The controller 230 may generate a compensated output signal G by compensating for the output signal B based on the identified error F, and may output the compensated output signal G to the outputter 240. Accordingly, the outputter 240 amplifies the compensated output signal G and outputs the amplified signal to the speaker 100, so that the speaker 100 may generate the compensated sound. However, the embodiment of the disclosure is not limited thereto.

Figure 7A:
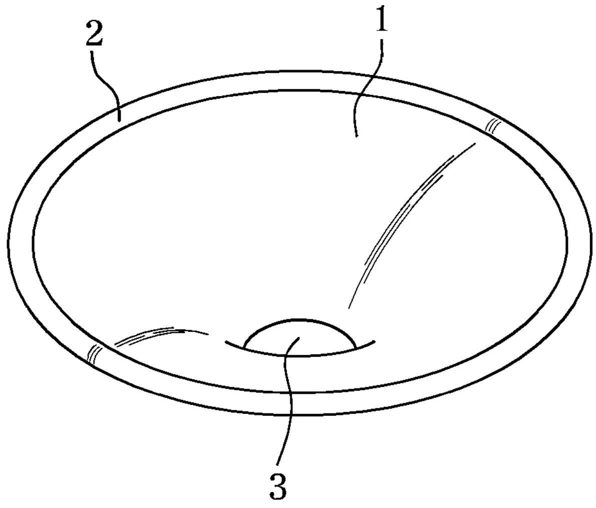
FIGS. 7A, 7B, and 8 are schematic views for explaining division of a diaphragm of a speaker according to an embodiment of the disclosure.
Figure 7B:
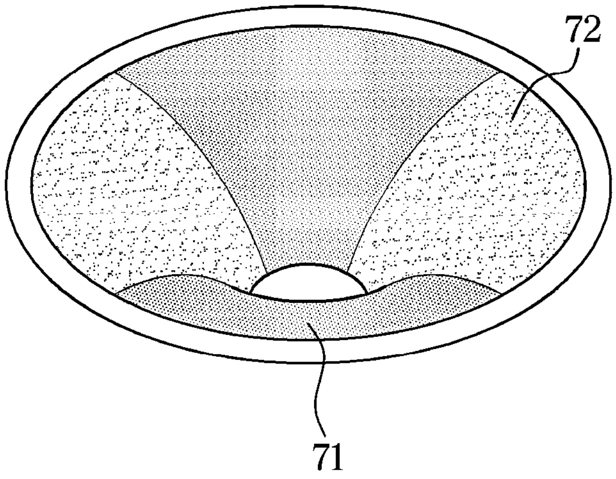
Figure 8:
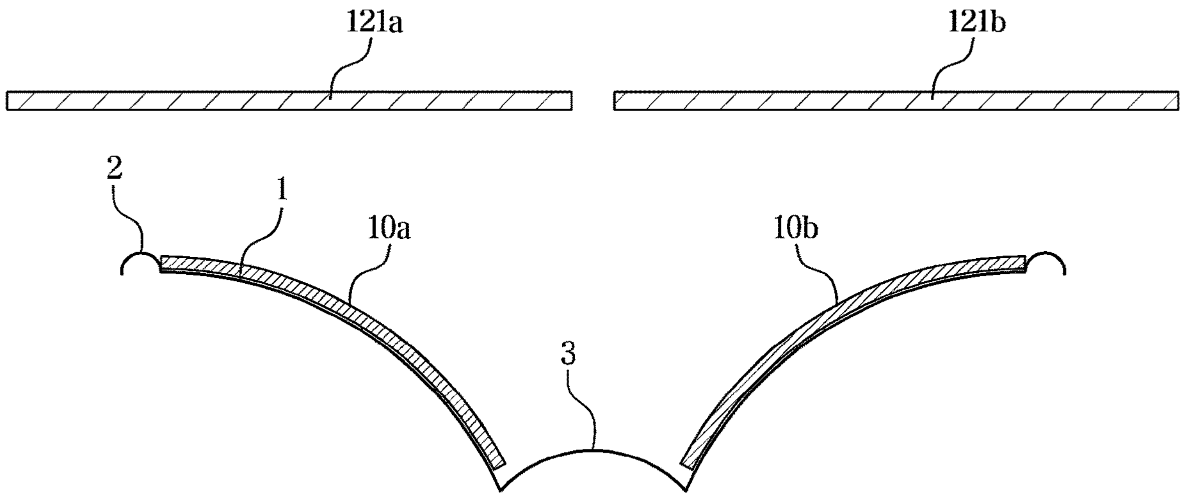

FIGS. 7A, 7B, and 8 are schematic views for explaining a division of the diaphragm 1 of the speaker 100 according to an embodiment of the disclosure.

Referring to FIGS. 7A and 7B, the diaphragm 1 of the speaker 100 generally vibrates to have the same phase at the same distance from the center thereof. However, in the case of the speaker 100 outputting an audio signal in a high frequency band for various reasons, acoustic distortion may occur. In this case, the diaphragm 1 may not have the same phase even at the same distance 71 and 72 from the center.

In the speaker system 1000 according to the embodiment of the disclosure, to detect such a problem, the front housing 121 of the speaker 100 is partitioned into at least two areas that are insulated from each other, and the diaphragm 1 of the speaker 100 may partitioned to have the capacitance C for each partitioned area. Meanwhile, as the number of partitioned areas increases, the sensitivity for detecting distortion may be increased. However, hereinafter, for convenience of description, it will be described by dividing the area into two areas.

Referring to FIG. 8, the front housing 121 of the speaker 100 may include a first front housing 121*a* and a second front housing 121*b*. The first and second front housings 121*a* and 121*b* may be spaced apart to be insulated from each other or an insulating material (e.g., a rubber) (not shown) may be inserted therebetween.

Furthermore, the surface coating 10 of the diaphragm 1 may be partitioned into a first coating 10*a* and a second coating 10*b*. The first coating 10*a* may be formed in an area vertically below (based on the drawing) the first front housing 121*a* so as to have the first front housing 121*a* and the capacitance C, which are described above. Accordingly, the first coating 10*a* and the first front housing 121*a* may form a first capacitance.

Furthermore, the second coating 10*b* may be formed in an area vertically below (based on the drawing) the second front housing 121*b* so as to have the second front housing 121*b* and the capacitance C, which are described above. Accordingly, the second coating 10*b* and the second front housing 121*b* may form a second capacitance.

As a result, to derive the first and second capacitances described above, the electric circuit 140 of the speaker 100 may include a plurality of second electric circuits 142 in which the first front housing 121*a* and the first coating 10*a* may be respectively connected to the measuring unit 250 and the second front housing 121*b* and the second coating 10*b* may be respectively connected to the measuring unit 250. However, the embodiment of the disclosure is not limited thereto. In another embodiment, depending on the number of partitioned areas of the front housing 121, the number of the surface coating 10 and the second electric circuit 142 may be provided correspondingly.

On the other hand, in this case, the preprocessor 260 may identify the first and second measurement signals based on the first and second capacitances measured by the measuring unit 250. Accordingly, the controller 230 may identify the error between the first and second measurement signals based on the processing of the first and second measurement signals. In addition, in response to that a plurality of measurement signals are identified by the preprocessor 260, the controller 230 may identify the error between each of the plurality of measurement signals. However, the embodiment of the disclosure is not limited thereto.

Furthermore, in response to that the identified error is greater than a predetermined value, the controller 230 may differently control the signal output to the outputter 240. In particular, the controller 230 may identify a frequency of the output signal when the error becomes greater than the predetermined value, and limit the frequency of the signal output to the outputter 240 as the identified frequency of the output signal. However, the embodiment of the disclosure is not limited thereto. In another embodiment, in response to that the identified error is greater than the predetermined value, the controller 230 may output a signal to output a warning sound.

Herein, the above-described predetermined value is an experimentally or empirically set value, and may be a value that allows a user to perceive distortion, but is not limited thereto.

Figure 9:
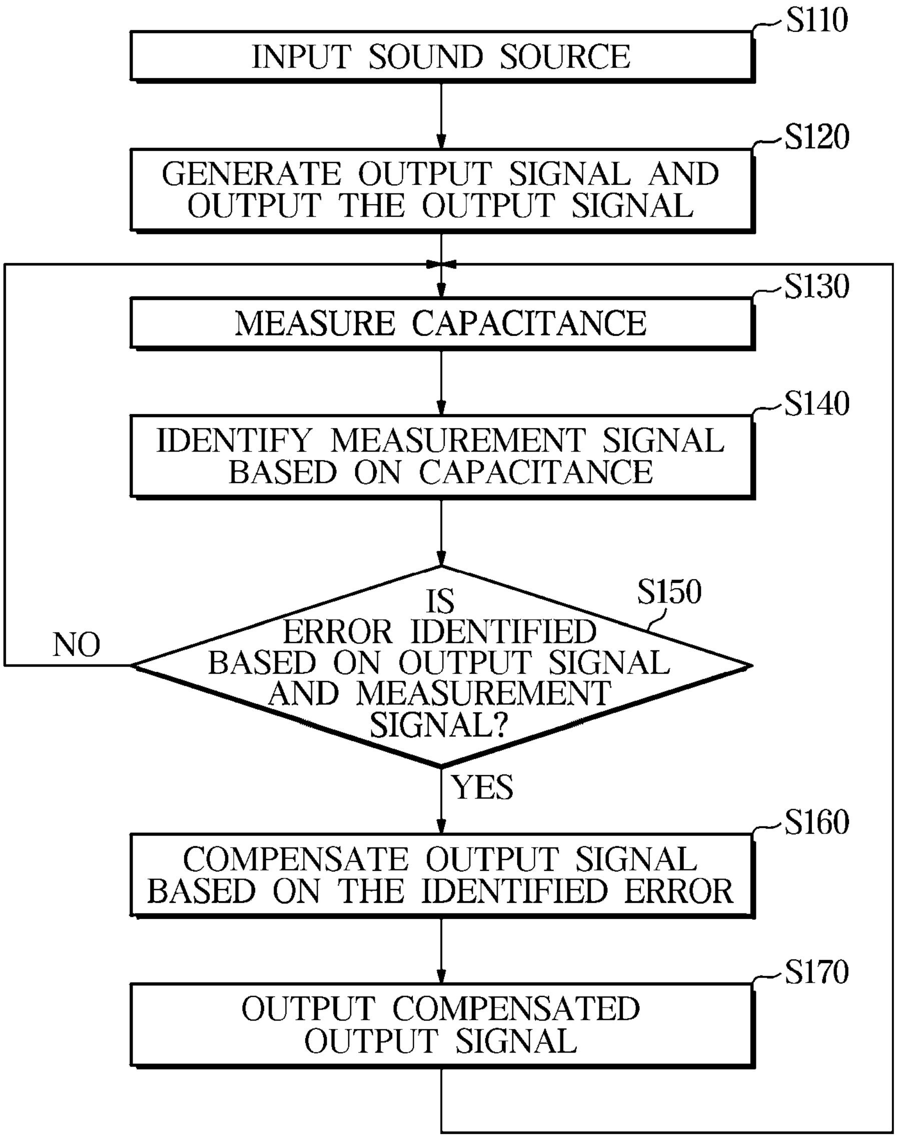
FIG. 9 is a flowchart illustrating a signal compensation method using a speaker system according to an embodiment of the disclosure.

FIG. 9 is a flowchart illustrating a signal compensation method using the speaker system 1000 according to an embodiment of the disclosure.

The signal compensation method shown in FIG. 9 may be performed by the speaker system 1000 described above. Accordingly, even if the contents omitted below, the descriptions of the speaker 100 and the speaker system 1000 may be equally applied to the description of the signal compensation method.

Referring to FIG. 9, the speaker system 1000 may receive the sound source composed of the digital signal (S110).

Furthermore, the speaker system 1000 may generate the output signal based on the digital signal input and output the output signal to the speaker 100 (S120).

Furthermore, the speaker system 1000 may measure the capacitance C between the front housing 121 of the speaker 100 and the diaphragm 1 (S130).

Furthermore, the speaker system 1000 may identify the measurement signal based on the capacitance C (S140).

Furthermore, the speaker system 1000 may identify whether the error between the output signal and the measurement signal exists based on the processing of the output signal and the measurement signal (S150).

At this time, if the identified error does not exist, the speaker system 1000 may measure the capacitance C again (S130).

Furthermore, if the identified error exists, the speaker system 1000 may compensate (correct) the output signal based on the identified error (S160).

Furthermore, the speaker system 1000 may generate the sound by outputting the compensated output signal to the speaker 100 (S170).

As is apparent from the above, the embodiments of the disclosure may compensate for the audio signal without excessive cost increase by identifying the capacitance with the diaphragm using the conductive grill of the conventional speaker.

Furthermore, the embodiments of the disclosure may compensate for the audio signal by identifying the error between the output signal and the measurement signal based on the identified capacitance.

On the other hand, the above-described embodiments may be implemented in the form of a recording medium storing commands executable by a computer. The commands may be stored in the form of program code. When the commands are executed by a processor, a program module is generated by the commands so that the operations of the disclosed embodiments may be carried out. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although embodiments of the disclosure have been shown and described, it would be appreciated by those having ordinary skill in the art that changes may be made in these embodiments without departing from the principles and spirit of the disclosure, the scope of which is defined in the claims and their equivalents.

What is claimed is:

1. A speaker system, comprising:

a speaker including a diaphragm, a surface of the diaphragm being coated with a conductive material so as to have a capacitance with a front housing; and an amplifier;

wherein the amplifier comprises:

a measuring unit configured to measure the capacitance, a preprocessor configured to identify a measurement signal based on the capacitance, a converter configured to convert an input digital signal into an analog signal to generate an output signal, a processor configured to process the output signal and the measurement signal, and an outputter configured to amplify a signal output from the processor and output the amplified signal to the speaker, wherein the surface of the diaphragm is partitioned into at least two areas that are insulated from each other so as to have at least two capacitances with the front housing, wherein the preprocessor identifies a plurality of measurement signals based on each of the at least two capacitances, wherein the processor is configured to:

identify a first error between the output signal and the measurement signal based on processing of the output signal and the measurement signal, output a compensated output signal based on the identified first error, and based on processing of the identified plurality of measurement signals, identify a second error between the identified plurality of measurement signals, and in response to the identified second error being greater than a predetermined value, control differently the signal output to the outputter.

2. The speaker system of claim 1, wherein the processor is further configured to limit a frequency of the signal output in response to the identified second error being greater than the predetermined value.

3. A signal compensation method, the method comprising:

generating, by an amplifier, an output signal and outputting the output signal to a speaker based on an input digital signal;

measuring, by a measuring unit, a capacitance between a diaphragm and a front housing of the speaker, wherein a surface of the diaphragm is coated with a conductive material so as to have the capacitance with the front housing including the conductive material, and partitioned into at least two areas that are insulated from each other so as to have at least two capacitances with the front housing;

identifying, by a preprocessor, a measurement signal based on the capacitance;

identifying, by a processor, a first error between the output signal and the measurement signal based on processing the output signal and the measurement signal; and outputting, by the processor, a compensated output signal based on the identified first error;

identifying, by the preprocessor, a plurality of measurement signals based on each of the at least two capacitances;

identifying, by the processor, a second error between the identified plurality of measurement signals based on processing the identified plurality of measurement signals; and outputting, by the processor, after compensation, at least one different signal in response to the identified second error being greater than a predetermined value.

4. The method of claim 3, wherein the outputting after compensation is configured to limit a frequency of the at least one different signal.

5. A non-transitory computer-readable recording medium storing a program that causes a computer to:

generate an output signal and outputting the output signal to a speaker based on an input digital signal;

measure a capacitance between a diaphragm and a front housing of the speaker;

identify a measurement signal based on the capacitance;

identify a first error between the output signal and the measurement signal based on processing the output signal and the measurement signal;

measure at least two capacitances between a partitioned diaphragm and a front housing of the speaker;

identify a plurality of measurement signals based on each of the at least two capacitances;

identify a second error between the output signal and a combined measurement signal based on processing the output signal and the plurality of measurement signals;

output a compensated output signal based on the identified first and second errors, wherein the speaker includes a diaphragm, a surface of which is coated with a conductive material so as to have the capacitance with the front housing including the conductive material.

* * * * *